United States Patent [19]
Watanabe et al.

[11] Patent Number: 6,041,885
[45] Date of Patent: Mar. 28, 2000

[54] ELECTRIC POWER STEERING APPARATUS

[75] Inventors: Katsuji Watanabe; Yasuo Shimizu, both of Wako, Japan

[73] Assignee: Honda Giken Kogyo Kabushiki Kaisha, Tokyo, Japan

[21] Appl. No.: 09/100,309

[22] Filed: Jun. 19, 1998

[30] Foreign Application Priority Data

Jul. 1, 1997 [JP] Japan ..................................... 9-176228

[51] Int. Cl.⁷ ....................................................... B62D 5/04
[52] U.S. Cl. ............................................................ 180/444
[58] Field of Search ..................................... 180/443–446

[56] References Cited

U.S. PATENT DOCUMENTS

| Re. 32,222 | 8/1986 | Drutchas . |
|---|---|---|
| 4,715,461 | 12/1987 | Shimizu . |
| 4,727,950 | 3/1988 | Shimizu et al. . |
| 4,766,970 | 8/1988 | Shimizu . |
| 4,771,843 | 9/1988 | Shimizu . |
| 4,773,497 | 9/1988 | Carlson et al. . |
| 4,834,202 | 5/1989 | Shimizu . |
| 5,299,649 | 4/1994 | Sano et al. . |
| 5,927,429 | 7/1999 | Sugino ..................................... 180/444 |

FOREIGN PATENT DOCUMENTS

7-165089  6/1995  Japan .

*Primary Examiner*—Christopher P. Schwartz
*Assistant Examiner*—C. T. Bartz
*Attorney, Agent, or Firm*—Merchant & Gould P.C.

[57] ABSTRACT

An electric power steering apparatus having a rack shaft supported at opposite end portions thereof by a rack-and-pinion mechanism and a ball-screw mechanism, respectively, includes a plain bearing slidably fitted around a rack shaft to support an intermediate portion of the rack shaft. The plain bearing thus provided considerably reduces a support span of the rack shaft and, hence, shifts a resonance frequency of the rack shaft to a higher frequency range. The rack shaft is, therefore, unlikely to cause vibration when external forces or moments caused due, for example, to a reaction from road surface during a steering operation act on opposite ends of the rack shaft.

10 Claims, 10 Drawing Sheets

ELECTRIC POWER STEERING APPARATUS

BACKGROUND OF THE INVENTION

1. Field of the Invention

The present invention relates to improvements in an electric power steering apparatus carried on a vehicle.

2. Description of the Related Art

In recent years, electric power steering apparatuses have increasingly been used to provide a comfortable steering touch or feel to the driver by reducing the manual steering effort or force needed to turn the steering wheel. The electric power steering apparatuses of the type concerned are constructed such that an assist torque generated by an electric motor in proportion to the steering torque is transmitted to a steeling system. One example of such electric power steering apparatuses is disclosed in Japanese Patent Laid-open Publication No. HEI 7-165089, entitled "STEERING APPARATUS".

The disclosed electric power steering apparatus includes a rack shaft having a rack of gear teeth at its one end portion and a worm screw at its other end portion, a pinion meshing with the rack, and a ball-screw mechanism (often referred to as "ball nut mechanism") having a nut engaged threadedly with the screw and driven in rotation by an electric motor. A rack guide is disposed in confronting relation to the pinion with the rack shaft disposed therebetween so as to guide a longitudinal reciprocating movement of the rack shaft. The rack guide is urged by a spring toward the rack shaft so that backlash between the rack and the pinion is removed.

The conventional electric power steering apparatus of the foregoing construction has a drawback, as will be understood from a description given below with reference to FIGS. 10A, 10B, 10C and 10D.

Figure 10A:
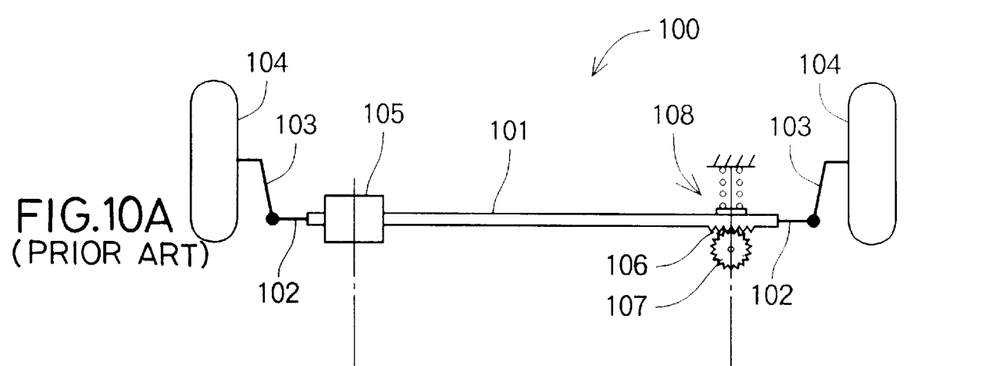
FIGS. 10A, 10B, 10C and 10D are diagrammatical views showing the behavior of a rack shaft of a conventional electric power steering apparatus.

FIG. 10A diagrammatically shows in plan view a vehicle steering system in which the electric power steering apparatus 100 is incorporated. In this figure, the rack shaft, the ball-screw mechanism, the rack, the pinion and the spring-loaded rack guide are designated by 101, 105, 106, 107 and 108, respectively. Numerals 102, 102 are tie rods connected at one end to the opposite ends of the rack shaft 101, and numerals 103, 103 are knuckle arms connecting the opposite ends of the rack shaft 101 to steerable front wheels 104, 104 via the tie rods 102, 102.

Figure 10B:
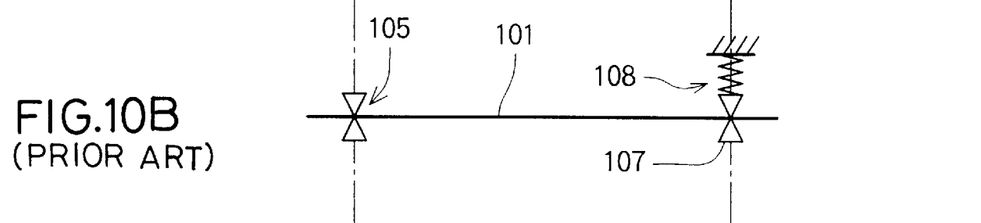

FIG. 10B diagrammatically illustrates a static condition of the rack shaft 101 which is achieved, for example, when the vehicle is stopped. In this condition, the rack shaft 101 is supported at two points, one corresponding in position to the position of the ball-screw mechanism 105 and the other to the position of a point of meshing engagement between the pinion 107 and the rack guide 108. The rack shaft 101 thus supported has a relatively long span (namely, the length of a part of the rack shaft 101 extending between the adjacent supporting points).

Figure 10C:
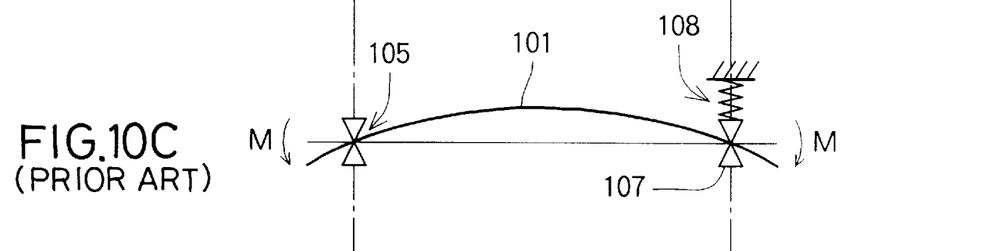
Figure 10D:
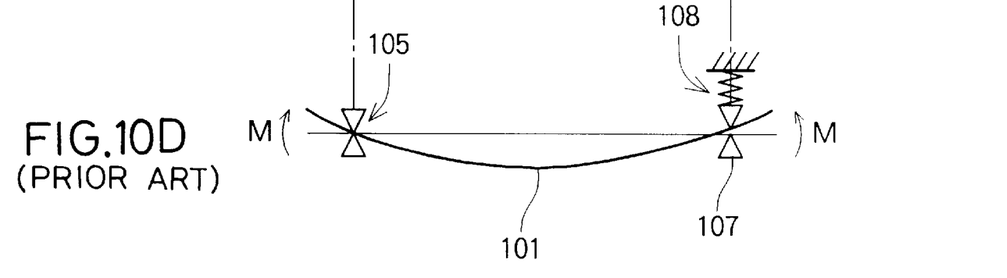

FIGS. 10C and 10D diagrammatically illustrate the behavior of the rack shaft 101 experienced when the vehicle is running. When the vehicle is running, particularly the steering wheel is turned, a reaction from road surface is transmitted through the tie rods 102, 102 to the rack shaft 101. Thus, the opposite ends of the rack shaft 101 are subjected to external forces or moments (hereinafter referred to as "moments M") acting in the same direction with the result that the rack shaft 101 is bent or flexed toward a forward or a backward direction of the vehicle, as illustrated in FIGS. 10C and 10D.

Especially, since the spring-loaded rack guide 108 is a simple spring-weight system which is constructed to support the rack shaft 101 by the force of the spring, it is not well responsive to vibrations in a higher frequency range, failing to provide a sufficient supporting force to the rack shaft 101. Accordingly, when the moments M, M from the backward direction of the vehicle act on the opposite ends of the rack shaft 101, the rack shaft 101 is bent or flexed backwardly of the vehicle in the manner shown in FIG. 10D, forcing the rack guide 108 to retract against the force of the spring.

The conventional electric power steering apparatus shown in FIGS. 10A–10D induces vibration in the rack shaft 101, the reasons for which are as follows:

(1) When each ball in the ball-screw mechanism 105 is in contact with or separated from a groove of the screw of the rack shaft 101, a collision occurs between the ball and flanks of the screw or nut whereupon a force transmitted from the ball to the screw or the nut is varied to thereby generate vibration in the rack shaft 101 (a first reason).

(2) When the vehicle is running, and more particularly, when the steering wheel is turned while the vehicle is running, a reaction from road surface is transmitted to the rack shaft 101 through the tie rods 102 to thereby cause the rack shaft 101 to vibrate in the forward and backward directions of the vehicle (a second reason).

(3) When the road surface reaction transmitted to the rack shaft 101 via the tie rods 102 acts to force the rack 106 in a longitudinal direction from the pinion 107 toward the ball-screw mechanism 105, the rack shaft 101 tends to bent or yield to thereby cause vibration in the rack shaft 101 (a third reason).

When a frequency of the vibration caused by the first reason equals a frequency of the vibration caused by the second or the third reason, vibration of the rack shaft 101 is amplified. Further, when the frequency of the amplified vibration approaches a natural free vibrating frequency of the rack shaft 101, the amplitude of vibration of the rack shaft 101 becomes larger due to resonant vibration.

Thus, the conventional electric power steering apparatus induces vibration in the rack shaft 101 as shown in FIGS. 10A to 10D when the ball nut mechanism 105 operates in response to a manual steering operation achieved by turning the steering wheel. Vibration of the rack 106 is amplified when the steering operation is taken for the purpose of parking the vehicle or corning of the vehicle with great acceleration where a reaction from road surface is large. The amplified vibration of rack 106 is transmitted to the passenger compartment through the steering wheel, thereby producing unpleasant noises in the passenger compartment. Vibration transmitted to the steering wheel directly provides an uncomfortable steering touch or feeling to the driver.

SUMMARY OF THE INVENTION

It is accordingly an object of the present invention to provide an electric power steering apparatus including a vibration damping unit which is simple in construction and is capable of sufficiently damping vibration of a rack shaft caused during steering operation.

According to the present invention, there is provided an electric power steering apparatus for a vehicle comprising: a rack shaft extending in a transverse direction of the vehicle and having a rack of gear teeth provided at a portion of a peripheral surface of one end portion thereof and an externally threaded screw provided at the other end portion thereof; a pinion meshing with the rack and rotatable to reciprocate the rack shaft in a longitudinal direction thereof; a rack guide disposed in confrontation with the pinion with the rack shaft disposed therebetween and resiliently urged against the rack shaft to support the one end portion of the rack shaft between the rack guide and the pinion while guiding reciprocating movement of the rack shaft; an electric motor for generating an assist torque corresponding to a steering torque; a nut threadedly mounted on the screw of the rack shaft for supporting the other end portion of the rack shaft and being rotatably driven by the electric motor for applying the assist torque to the rack shaft; and a plain bearing slidably fitted around the rack shaft to support a portion of the rack shaft located intermediately between the rack guide and the nut.

With the plain bearing thus provided, the rack shaft also supported at its opposite end portions by a rack-and-pinion mechanism and the nut of a ball-screw mechanism, respectively, has a three supporting points and, hence, a support span of the rack shaft is greatly smaller than that of the conventional rack shaft (having two supporting points located at the opposite end portions thereof) and a resonance frequency of the rack shaft shifts to a higher frequency range. With this shift of resonance frequency, the rack shaft is unlikely to induce vibration as compared to the prior rack shaft. Vibration of the rack shaft which may be caused during operation of the electric power steering apparatus is considerably smaller in magnitude than vibration induced in the conventional rack shaft. The plain bearing is simple in construction and can efficiently damp the vibration of rack shaft. Since vibration of the rack shaft is considerably damped, the steering wheel operatively connected to the rack shaft does not induce noticeable vibration tending to deteriorate a comfortable steering touch or feeling and to generate an unpleasant noise in the passenger compartment. The rack-and-pinion mechanism and the ball-screw mechanism both assembled with the vibration-damped rack shaft can operate stably and reliably for a prolonged period of use and, accordingly, the electric power steering apparatus is highly durable and has a long service life.

In one preferred embodiment of the invention, the plain bearing comprises a split sleeve bearing and is resiliently deformable in a radial direction to vary an inside diameter thereof. The split sleeve can accommodate a thermal deformation caused due to the difference in thermal expansion coefficient between the plain bearing and the rack shaft.

The plain bearing may comprise a sleeve bearing having a plurality of resilient projections provided on an inner peripheral surface thereof at equal circumferential intervals. The sleeve bearing having such resilient projections is capable of accommodating a change in the inside diameter of the plain bearing caused due to abrasive wear and damping vibration of the rack shaft.

In another preferred embodiment of the invention, the plain bearing comprises a split annular bush and is resiliently deformable in a radial direction to vary an inside diameter thereof. An annular preloading member is fitted around an outer peripheral surface of the split annular bush to exert a preloading force on the split annular bush which tends to urge the split annular bush in a radial inward direction. The split bush urged in a radial inward direction can accommodate a change in the inside diameter of the plain bearing caused due to abrasive wear. The preloading member is preferably made of an elastic material having a high vibration damping property.

The above and other objects, features and advantages of the present invention will become apparent to those versed in the art upon making reference to the following description and accompanying sheets of drawings in which certain preferred structural embodiments of the present invention are described by way of illustrative examples.

DETAILED DESCRIPTION OF THE PREFERRED EMBODIMENTS

Certain preferred embodiments of the present invention will be described in greater detail with reference to the accompanying drawings.

Figure 1:
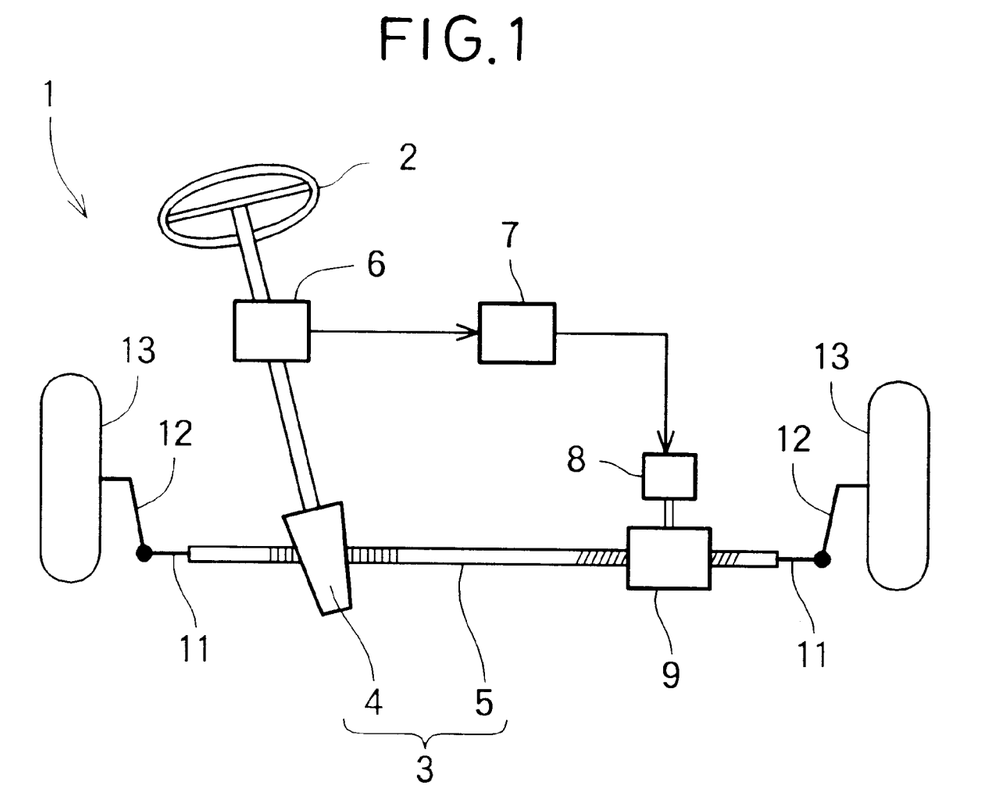
FIG. 1 is a diagrammatical view showing the general construction of an electric power steering apparatus according to the present invention.

Referring now to FIG. 1, there is shown the general construction of an electric power steering apparatus embodying the present invention. The electric power steering apparatus 1 generally comprises a rack-and-pinion mechanism 3 (composed of a pinion 4 and a rack shaft 5) operatively connected to a steering wheel 2 of a vehicle, a steering torque detecting means 6 for detecting a steering torque generated in a steering system during manual steering operation of the steering wheel 2 and generating an electric detection signal indicative of the detected steering torque, a control means or controller 7 for generating an electric control signal on the basis of the detection signal from the steering torque detecting means 6, an electric motor 8 for generating, on the basis of the control signal from the controller 7, an assist torque corresponding to the steering torque, and a ball-screw mechanism (often referred to as "ball nut mechanism") 9 for transmitting the assist torque from the electric motor 8 to the rack shaft 5. The rack shaft 5 is connected at opposite ends to steerable front wheels 13 via tie rods 11 and knuckle arms 12.

Figure 2:
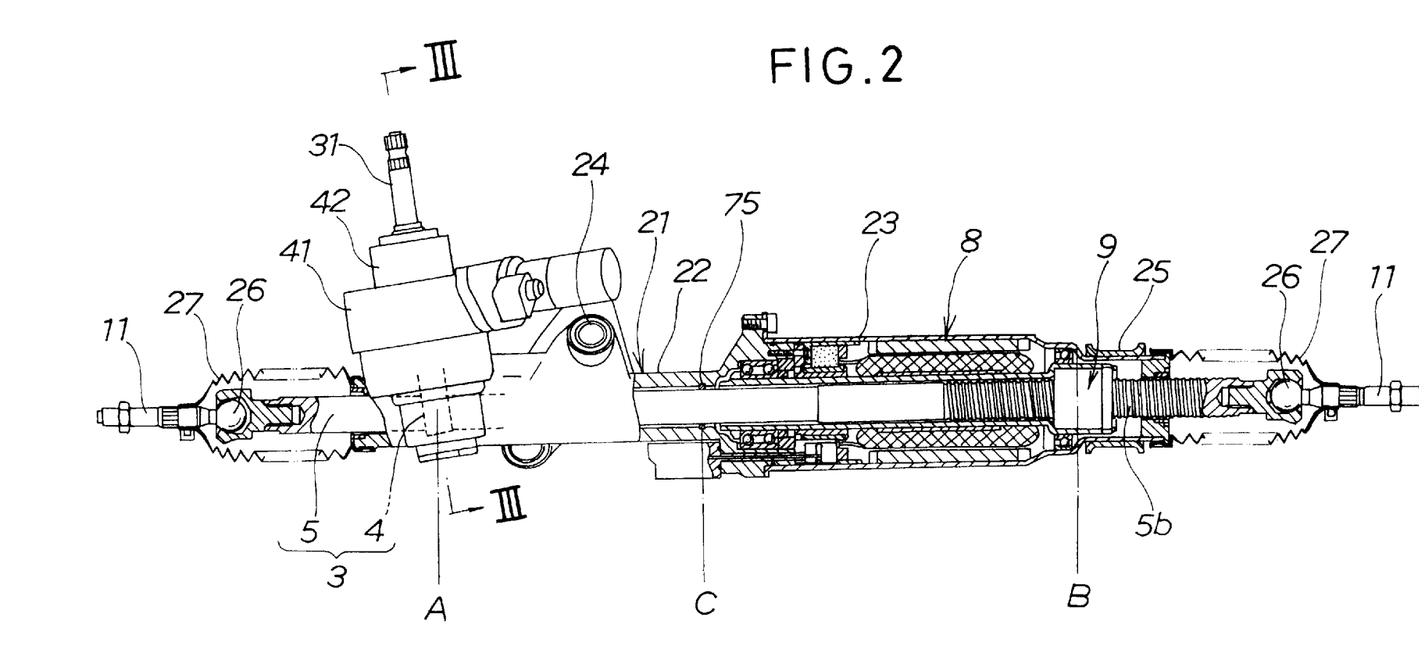
FIG. 2 is a front elevational view with parts in cross section of a portion of the electric power steering apparatus.

As shown in FIG. 2, the rack-and-pinion mechanism 3, the electric motor 3 and the ball-screw mechanism 9 of the electric power steering apparatus 1 are received or housed in a steering gearbox 21 extending in a crosswise or transverse direction of the vehicle. The steering gearbox 21 is composed of two generally tubular housings 22, 23 connected together end to end by means of screws (one being shown). The first housing 22 has a bracket 24 for mounting the first housing 22 to a body of the vehicle. Similarly, the second housing 23 has a mounting member 25 for mounting the second housing 23 to the vehicle body.

The rack shaft 5, extending in the transverse direction of the vehicle, has one end portion (left-hand side in FIG. 2) meshing with the pinion 4 and an opposite end portion (right-hand side in FIG. 2) assembled with the ball-screw mechanism 9. The opposite ends of the rack shaft 5 are connected to the tie rods 11, 11. The rack shaft 5 extends longitudinally through the gearbox 21 and is reciprocally movable in a longitudinal direction thereof (i.e., the transverse direction of the vehicle). The steering gearbox 21 further encloses a rack guide 50 (FIG. 3) disposed in confronting relation to the pinion 3 with the rack shaft 5 disposed between the rack guide 50 and the pinion 3, and a plain bearing 75 (FIG. 4) slidably fitted around the rack shaft 5 to support a longitudinal central portion of the rack shaft 5, as will be described later. The rack guide 50 is alined with a point of meshing engagement between the pinion 4 and the rack shaft 5.

In FIG. 2, a center of meshing engagement between the pinion 4 and the rack shaft 5 (hereinafter referred to as "pinion center"), a center of the ball-screw mechanism 9 (hereinafter referred to as "ball-screw center"), and a center of the plain bearing 75 (hereinafter referred to as "bearing center") are designated by A, B and C, respectively. The bearing center C is preferably located substantially centrally between the pinion center A and the ball-screw center B. However, a satisfactory result can still be attained as long as the bearing center C is located intermediately between the pinion center A and the ball-screw center B. In the illustrated embodiment, the bearing center C is offset from a longitudinal central point of the rack shaft 5 toward the pinion center A. Namely, the bearing center C is located closer to the pinion center A than to the ball-screw center B.

Thus, at the pinion center A, the pinion 4 and the rack guide 50 (FIG. 3) jointly support or retain one end portion of the rack shaft 5. At the ball-screw center B, a nut 71 (FIG. 4) of the ball-screw mechanism 7 supports or retains the other end portion of the rack shaft 5, and at the bearing center C, the plain bearing 75 supports or retains an intermediate portion of the rack shaft 5. In FIG. 2, reference numeral 26 denotes a ball joint interconnecting each of the tie rods 11 and a corresponding one end of the rack shaft 5, and numeral 27 denotes a rubber bellows covering a joint portion between the rack shaft 5 and each tie rod 11.

Figure 3:
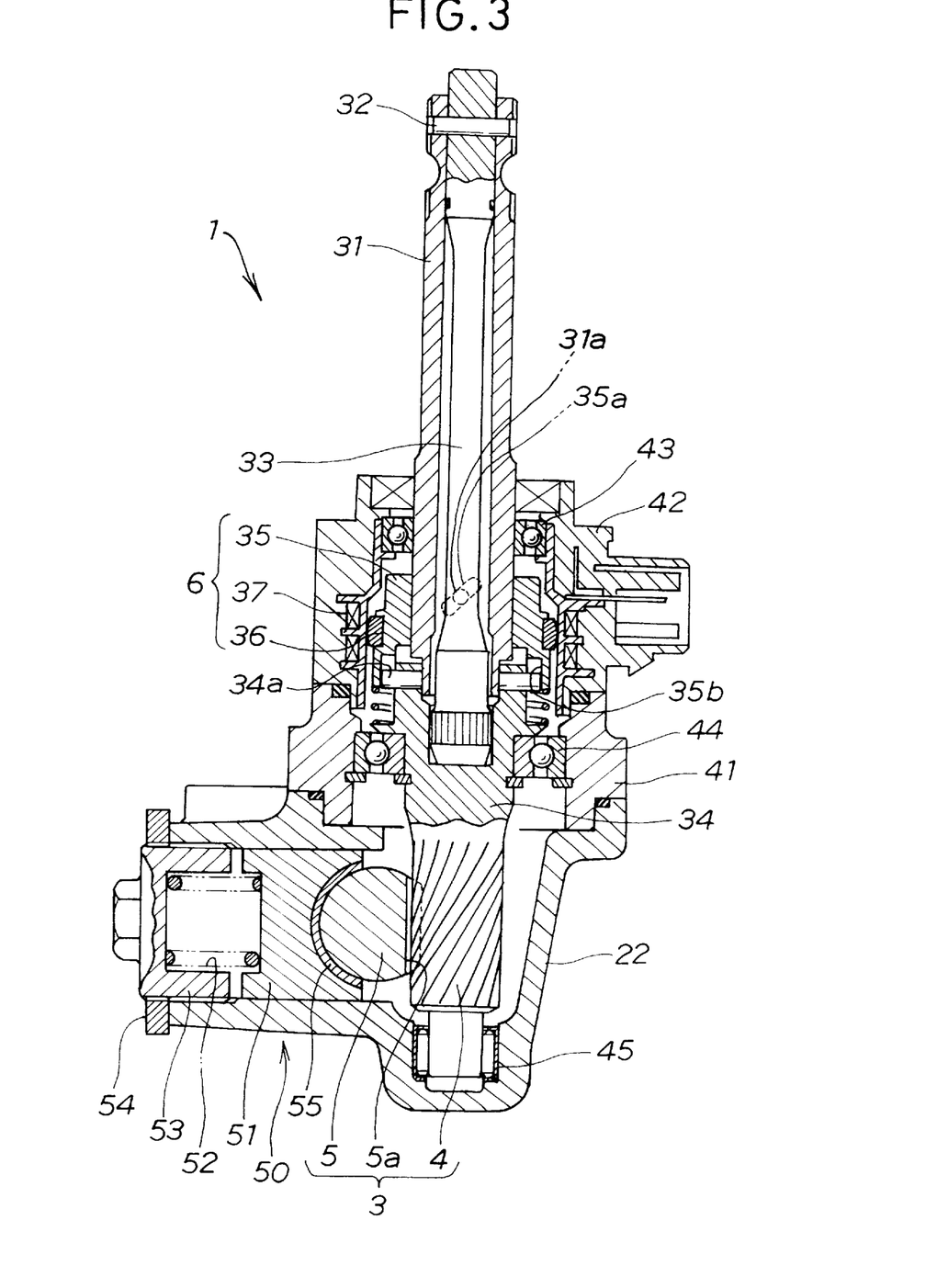
FIG. 3 is a cross-sectional view taken along line III—III of FIG. 2, showing a rack-and-pinion mechanism.

As shown in FIG. 3, the electric power steering apparatus 1 includes a tubular input shaft 31 operatively connected at its upper end to the steering wheel 2 (FIG. 1), a torsion bar (resilient member) 32 extending through the tubular input shaft 31 and connected at its upper end to the upper end of the input shaft 31 by means of a pin 32, and an output shaft 34 serration-connected at its upper end portion to a lower end portion of the torsion bar 33. The input shaft 31, the torsion bar 33, and the output shaft 34 jointly form a main part of a steering system extending between the steering wheel 2 and the steerable front wheels 9 (FIG. 1). The torsion bar 33 is a member which is capable of producing a twist angle exactly proportional to the steering torque and which allows the input and output shafts 31, 34 to create a relative torsional displacement therebetween.

The steering torque detecting means 6 is constructed to detect a steering torque in the steering system by detecting a relative twist between the input shaft 31 and the output shaft 34 connected by the torsion bar 33.

In the illustrated embodiment, the steering torque detecting means 6 is a non-contacting steering torque sensor (variable inductance displacement sensor) composed of a slider 35 engaged with both the input and output shafts 31, 34 so that the slider 35 is movable in an axial direction of the shafts 31, 34 in proportion to the amount of relative torsional displacement between the input and output shafts 31, 34, a core 36 formed integrally with the slider 35, and a stationary coil 37 for converting the amount of axial displacement of the slider 35 (equal to the amount of displacement of the core 36) into an electric signal. The slider 35 is in the form of a hollow cylindrical sleeve slidably fitted around a lower portion of the input shaft 31 and an upper portion of the output shaft 34. The slider 35 has a helical groove 35a and an axial straight groove 35b. The helical groove 35a slidably receives therein a pin 31a attached to the input shaft 31, while the straight groove 35b slidably receives therein a pin 35b attached to the output shaft 34. With this arrangement, the slider 35 is displaceable in the axial direction in response to the relative torsional displacement between the input shaft 31 and the output shaft 34.

Reference numerals 41 and 42 shown in FIG. 3 denote a third housing and a fourth housing, respectively, that are connected end to end in a vertical direction. The third housing 41 is attached to an upper open end portion of the first housing 22. The input shaft 31 is rotatably supported by a ball bearing 43 mounted in the fourth housing 42. Opposite end portions of the output shaft 34 are rotatably supported by a ball bearing 44 and a needle bearing 45 fitted in the third housing 41 and the first housing 22, respectively. The coil 36 of the steering torque detecting means 6 is firmly attached to the inside surface of the fourth housing 42.

The output shaft 34 shown in FIG. 3 is toothed on its peripheral surface so as to form the pinion 4 of the rack-and-pinion mechanism 3. The pinion 4 is in mesh with a rack 5a of gear teeth provided at a portion of the peripheral surface of the one end portion (left-hand side in FIG. 2) of the rack shaft 5.

The rack guide 50 is composed of a guide member 51 for supporting and guiding a back side surface of the peripheral surface of the rack shaft 5, diametrically opposed from the peripheral surface portion on which the rack 5a is formed, an adjustment screw 53 for forcing the guide member 51 toward the rack shaft 5 via a compression spring 52 acting between the guide member 51 and the adjustment screw 53, and a lock nut 54 mounted threadedly on the adjustment screw 53 to lock the adjustment screw 53 in position against movement relative to the first housing 22. The adjustment screw 53 is threaded in a horizontal threaded hole (not designated) formed in one side of the first housing 22. In order to adjust a preloading force exerted from the compression spring 52 through the guide member 51 to the rack shaft 5, the adjustment screw 53 is turned in either direction while the lock nut 54 is kept loosened. Rotation of the adjustment screw 53 changes the effective length of the compression spring 52 which varies with a controlled spring force or resiliency of the compression spring 52. With this adjustment of the preloading force, an adequate backlash-free meshing engagement is provided between the rack 5a and the pinion 4. The guide member 51 has a front surface covered with a semi-cylindrical lining 55 of low-friction material to insure smooth sliding movement of the rack shaft 5 relative to the rack guide 50.

Figure 4:
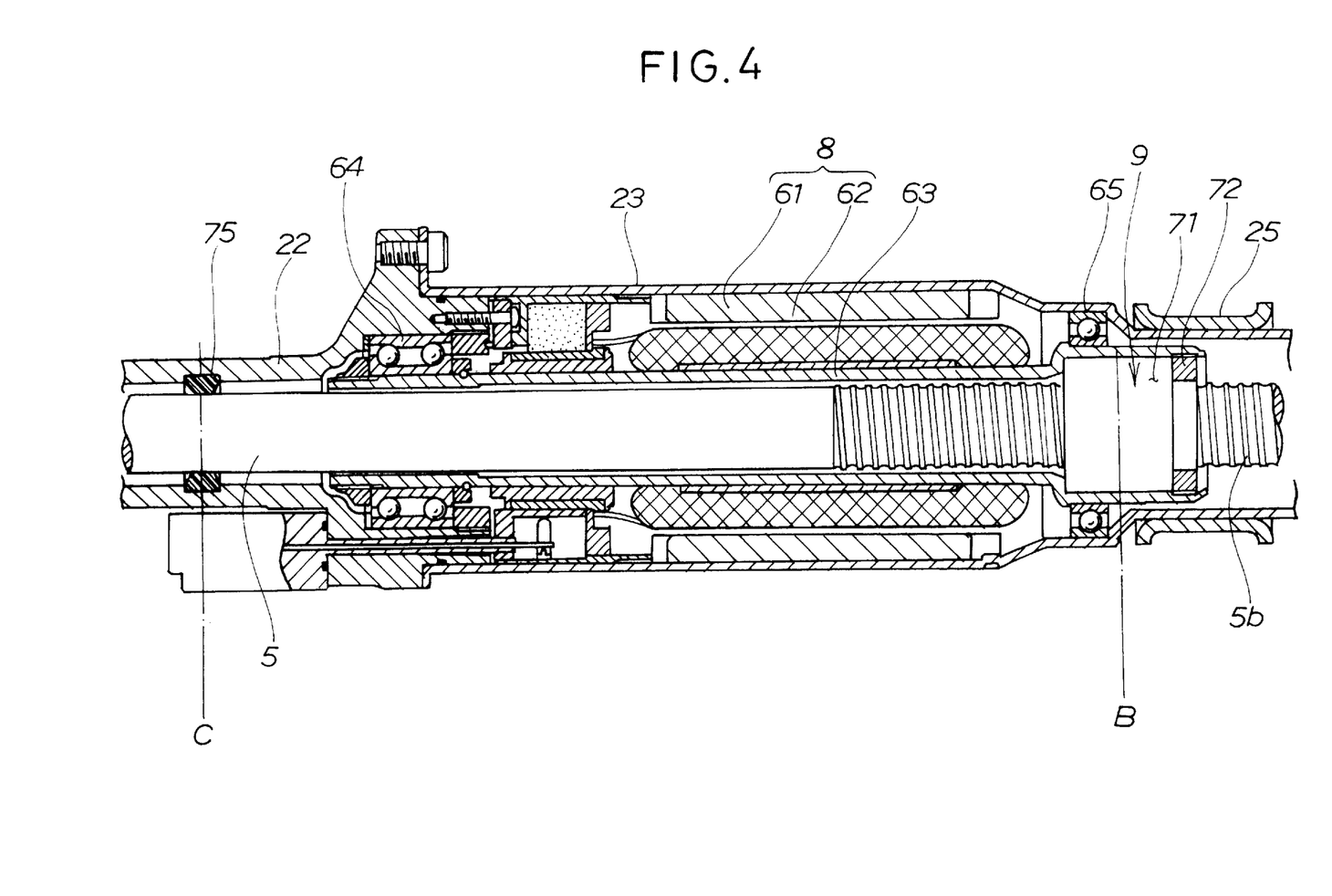
FIG. 4 is a longitudinal cross-sectional view showing a rack shaft of the rack-and-pinion mechanism and an electric power assist device assembled therewith.

As shown in FIG. 4, the electric motor 8 includes a hollow cylindrical stator 61 received in and fixed to the second housing 23, and a rotor 62 concentrically disposed in the stator 61. The rotor 62 has a tubular output shaft 63 through which the rack shaft 5 extends for movement in both axial and circumferential directions relative to the output shaft 63. The output shaft 63 has opposite end portions rotatably supported by a double row ball bearing 64 and a single row ball bearing 65 mounted respectively in the first housing 22 and the second housing 23. One end portion (right side in FIG. 4) of the output shaft 63 firmly retains therein the nut 71 of the ball-screw mechanism 9. The nut 71 is fixed in position against movement in an axial direction relative to the output shaft 63 by means of a lock screw 72 threaded into an internally threaded one end portion of the output shaft 63. The ball bearing 65 supports an intermediate portion of the ball-screw mechanism 9 via an output shaft 63 which is located in registry with or closer to the ball bearing center B.

The ball-screw mechanism 9 includes an externally threaded screw (such as a worm screw) 5b formed on the peripheral surface of the other end portion (right side in FIG. 2) of the rack shaft 5, and the nut 71 mounted threadedly on the screw 5b, with a plurality of steel balls (not shown) disposed between the worm screw 5b and the nut 71. With this arrangement, a rotational movement of the nut 71 is translated into an axial reciprocating motvement of the screw 5b and the rack shaft 5. During operation of the ball-screw mechanism 9, the balls successively move along grooves in the screw 5b and the nut 71 in a direction from one end to the other end of the nut 71. After their arrival at the other end, the balls return to the one end of the nut 71 through a guide groove formed in the nut 71. The ball-screw mechanism (ball nut mechanism) 9 having such circulating balls is known per se, and further description thereof can, therefore, be omitted.

Figure 5A:
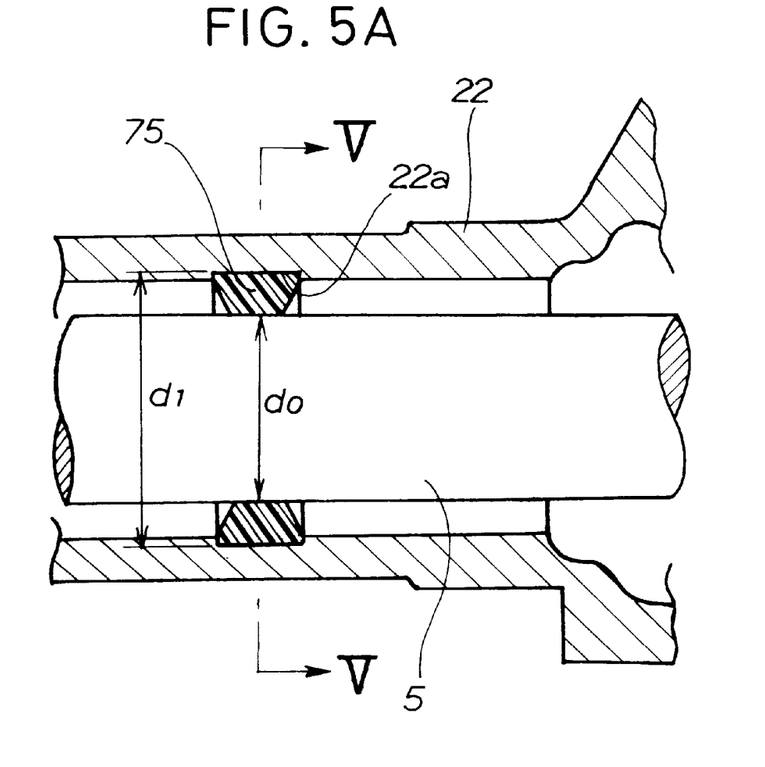
FIG. 5A is a longitudinal cross-sectional view of a central portion of the rack shaft supported by a plain bearing according to a first embodiment of the present invention.
Figure 5B:
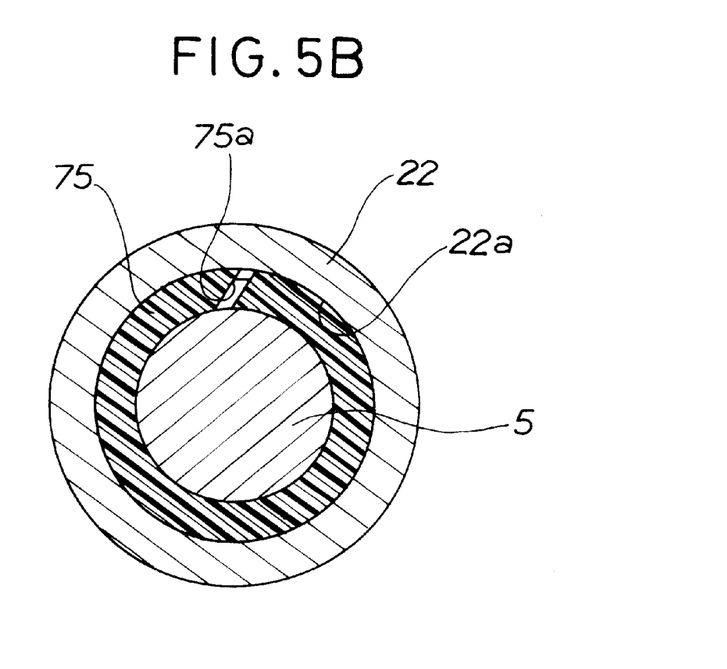
FIG. 5B is a cross-sectional view taken along line V—V of FIG. 5A.

As shown in FIGS. 5A and 5B, the plain bearing 75 is comprised of a ring-like bearing member often referred to as radial sleeve bearing . The sleeve bearing (plain bearing) 75 is fixedly mounted in a bearing mount hole 22a in the first housing 22. The sleeve bearing 75 is preferably made from a material having a low coefficient of friction and high self-lubricating characteristics. A typical example of such material is fluororesins including tetrafluoroethylene (TFE) resin (available under the trade name "Teflon"). It is further desirable that the plain bearing 75 made of a vibration damping material, such as a cast iron, sintered metal or plastic.

The plain bearing (sleeve bearing) 75 preferably has an inside diameter so dimensioned as to insure a low friction contact between the plain bearing 75 and the rack shaft 5 at all times, thereby providing a constant support to an intermediate portion of the rack shaft 5.

To this end, the thickness of the plain bearing 75 should preferably be set such that within a certain temperature range of use of the vehicle, the thickness become always equal to the difference between the inside diameter of the bearing mount hole 22a and the outside diameter of the rack shaft 5. More concretely, the thickness of the plain bearing 75 is determined in such a manner that a particular relation represented by the following Equation (1) holds for a certain temperature difference $\Delta T$ corresponding to the temperature range of use of the vehicle.

(a change in the thickness of the plain bearing 75)=(a change in the inside diameter of the bearing mount hole 22a)−(a change in the outside diameter of the rack shaft 5)    (1)

The Equation (1) may be expressed by the following Equation (2).

$$\alpha 1 \cdot \pi (d1-d0) \Delta T = \alpha 2 \cdot \pi \cdot d1 \cdot \Delta T - \alpha 0 \pi \cdot d0 \cdot \Delta T \qquad (2)$$

where d0: the outside diameter (mm) of the rack shaft 5, d1: the inside diameter of the bearing mount hole 22a, $\alpha 0$: the linear coefficient of thermal expansion (/° C.) of the rack shaft 5, $\alpha 1$: the linear coefficient of thermal expansion (/° C.) of the plain bearing 75, and $\alpha 2$: the linear coefficient of thermal expansion (/° C.) of the first housing 22.

We express the Equation (2) by rearranging it as follows.

$$d1 = d0(\alpha 1 - \alpha 0)/(\alpha 1 - \alpha 2) \qquad (3)$$

It will be understood from the foregoing description that by setting the inside diameter d1 of the bearing mount hole 22a at a value determined by the Equation (3), the thickness of the plain bearing 75 becomes always equal to an actual clearance between the first housing 22 and the rack shaft 5, regardless of the temperature change, on condition that the first housing 22, the plain bearing 75 and the rack shaft 5 undergo the same temperature difference.

Thus, changes in diameter of the rack shaft 5, bearing mount hole 22a and plain bearing 75 caused due to the temperature change can be taken up or canceled. As a result, the axial reciprocating movement of the rack shaft 5 is always achieved smoothly without encountering undue frictional resistance between the rack shaft 5 and the plain bearing 75.

In practice, however, due to some reasons, the first housing 22, the plain bearing 75 and the rack shaft 5 sometimes undergo different temperature differences while they are used in the same temperature. In this instance, a thermal deformation caused due to the difference in thermal expansion coefficient between the the housing 22, plain bearing 75 and rack shaft 5 cannot be taken up or canceled, hindering smooth sliding movement of the rack shaft 5 relative to the plain bearing 75. To cope with this problem, the plain bearing 75 has a longitudinal slit 75a to form a split sleeve bearing, as shown in FIG. 5. The split sleeve bearing 75 is deformable in a radial direction (i.e., the diameter of the split sleeve bearing 75 is variable) so that thermal deformations of the first housing 22, plain bearing 75 and rack shaft 5 tending to hinder smooth sliding movement of the rack shaft 5 relative to the plain bearing 75 can be taken up or canceled. Thus, regardless of the temperature change, the rack shaft 5 always can slide smoothly relative to the plain bearing 75. The plain bearing 75 thus supporting an intermediate portion of the rack shaft 5 is effective to damp vibration of the rack shaft 5.

Operation of the electric power steering apparatus 1 of the foregoing construction will be described with reference to FIGS. 6A, 6B, 6C and 6D.

Figure 6A:
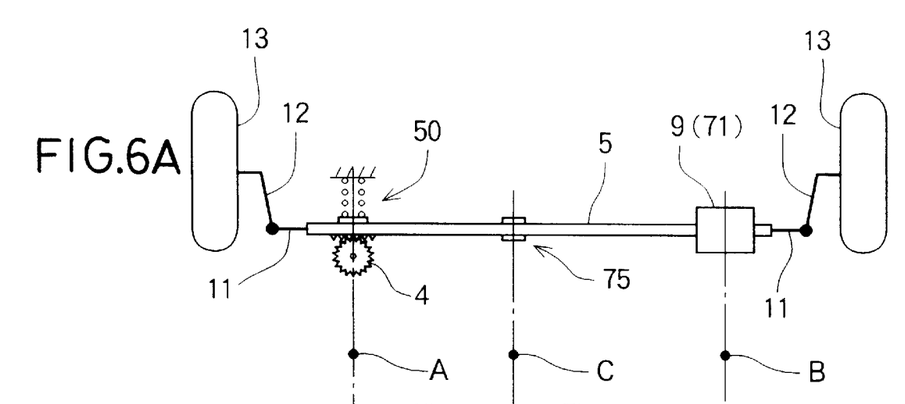
FIGS. 6A, 6B, 6C and 6D are diagrammatical views illustrative of the behavior of the rack shaft taken in conjunction with operation of a supporting system including the plain bearing.
Figure 6B:
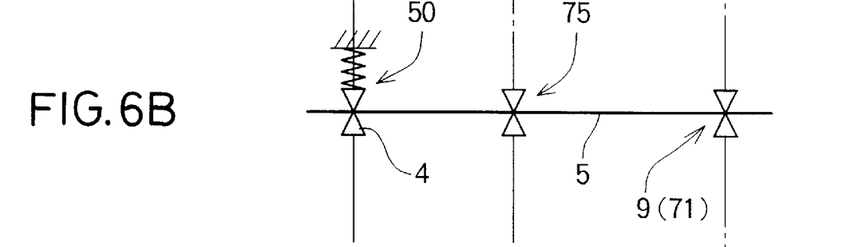

FIG. 6A diagrammatically illustrates in plan view the electric power steering apparatus including the rack shaft 5 and a support structure thereof. FIG. 6B is a diagrammatical view showing a static condition of the rack-shaft support structure including three supporting points located at the pinion center A, the ball-screw center B and the bearing center C, respectively. At the pinion center A, the pinion 4 supports one end portion (left-hand side in FIG. 6B) of the rack shaft 5 from the backward direction of the vehicle, and the rack guide 50 supports the same end portion of the rack shaft 5 from the forward direction of the vehicle. At the ball-screw center B, the nut 71 of the ball-screw mechanism 9 supports the other end portion (right-hand side in FIG. 6B) of the rack shaft 5 while preventing movement of the rack shaft in a radial direction relative to the nut 71 (including the forward and backward directions of the vehicle). Similarly, at the bearing center C, the plain bearing 75 supports an intermediate portion of the rack shaft 5 while preventing movement of the rack shaft in a radial direction relative to the plain bearing 75 (including the forward and backward directions of the vehicle).

Figure 6C:
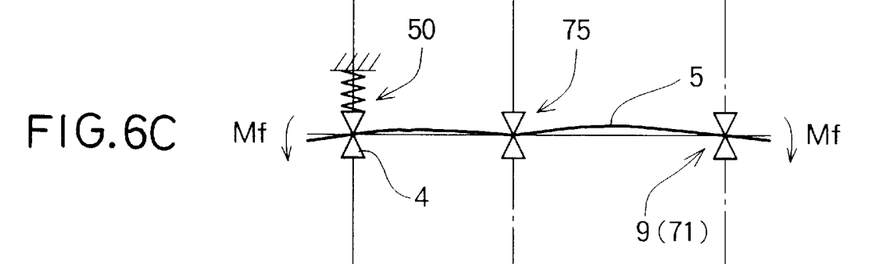

When the steering wheel 2 (FIG. 1) is turned while the vehicle is running, the rack shaft 5 is subjected to external forces or moments M acting on the opposite ends thereof under the effect of a reaction from road surface and operation of the ball-screw mechanism 9. The moments M when they act from the forward direction of the vehicle are designated by Mf, Mf, as shown in FIG. 6C. Conversely, the moments acting from the backward direction of the vehicle are designated by Mr, Mr, as shown in FIG. 6D.

When subjected to the moments Mf, Mf, the rack shaft 5 tends to bend or flex toward the forward direction of the vehicle in the manner shown in FIG. 6C as it is supported or retained at its one end portion, an intermediate portion and the other end portion by the pinion 4, the plain bearing 75 and the nut 71, respectively.

Figure 6D:
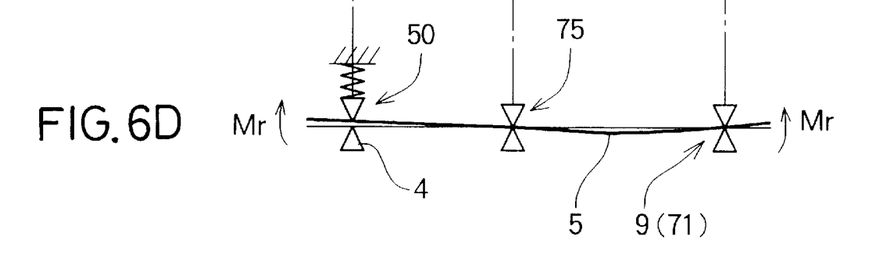

On the other hand, when subjected to the moments Mr, Mr, the rack shaft 5 tends to bend or flex toward the backward direction of the vehicle in the manner shown in FIG. 6D as it is supported or retained at its one end portion, the intermediate portion and the other end portion by the rack guide 50, the plain bearing 75 and the nut 71, respectively.

Because the rack shaft 5 is always supported at three points, a supporting span of the rack shaft 5 (i.e., the length of a portion of rack shaft 5 extending between the adjacent supporting points A and B or B and C) is shorter than that of the prior rack shaft having two supporting points (FIGS. 10A–10D) and, hence, a resonance frequency of the rack shaft 5 shifts to a higher frequency range. With this shift of resonance frequency, the rack shaft 5 is unlikely to induce vibration as compared to the prior apparatus. Thus the amplitude of vibration of the rack shaft 5 is damped to a greater extent by merely providing the plain bearing 75 for the purpose of supporting an intermediate portion of the rack shaft 5. The plain bearing 75 is simple in construction but can efficiently damp the vibration of the rack shaft 5. Since vibration of the rack shaft 5 is considerably damped, the steering wheel 2(FIG. 1) operatively connected to the rack shaft 5 does not induce noticeable vibration tending to provide an uncomfortable steering touch or feeling to the driver and generate an unpleasant noise in the passenger compartment.

Figure 7A:
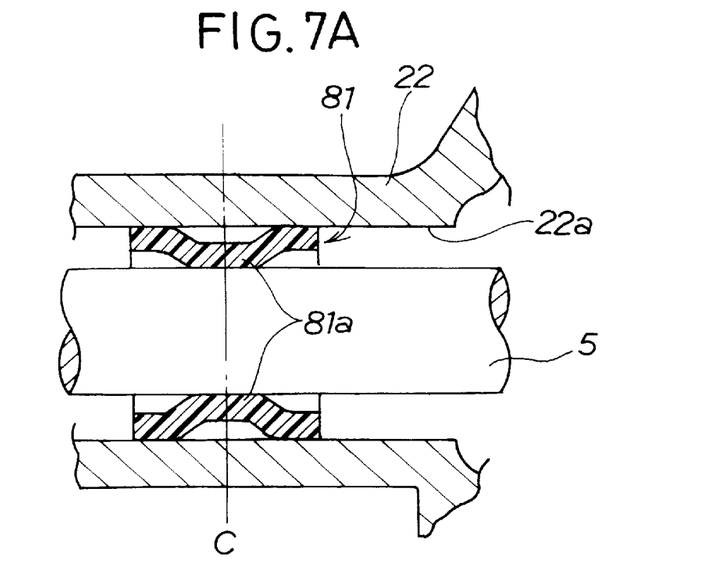
FIG. 7A is a view similar to FIG. 5A, but showing a modified form of the plain bearing according to the present invention.
Figure 7B:
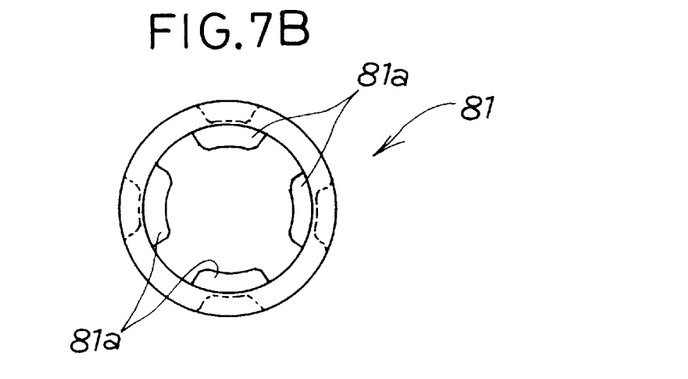
FIG. 7B is an end view of the plain bearing shown in FIG. 7A.
Figure 7C:
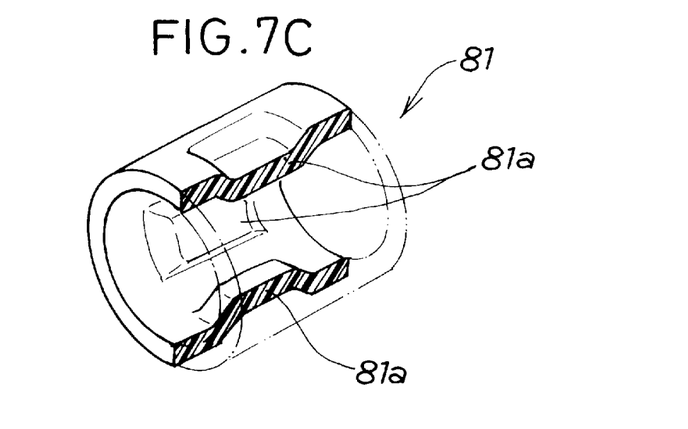
FIG. 7C is a perspective view with parts cutaway for clarity of the plain bearing shown in FIG. 7A.

FIGS. 7A through 7C show a modified form of the plain bearing 75 according to the present invention. The modified plain bearing 81 is a radial sleeve bearing fixedly mounted in the bearing mount hole 22a in the first housing 22 and slidably fitted around an intermediate portion of the rack shaft 5. The sleeve bearing (plain bearing) 81 is preferably made from a material having a low coefficient of friction and high self-lubricating characteristics. The sleeve bearing 81 has a plurality (four in the illustrated embodiment) of resilient support projections 81a formed on an inner peripheral surface at equal circumferential intervals. The resilient supports 81a, due to their own resiliency, are held in sliding contact with the peripheral surface of the rack shaft 5 and jointly support or retain the intermediate portion of the rack shaft 5.

The resilient support projections 81a are resiliently deformable in a radial direction and, hence, can define an appropriate inside diameter required for supporting the rack shaft 5 in a stable manner even when they have undergone a certain extent of abrasive wear. The plain bearing 81 having such resilient support projections 81a can also accommodate a thermal deformation which may be caused due to the difference in thermal expansion coefficient between the first housing 22, the plain bearing 81 and the rack shaft 5. As a result, the rack shaft 5 and the plain bearing 81 can always keep an adequate friction therebetween. By virtue of the resilient support projections 81a, the plain bearing 81 can efficiently damp vibration of the rack shaft 5.

Figure 8A:
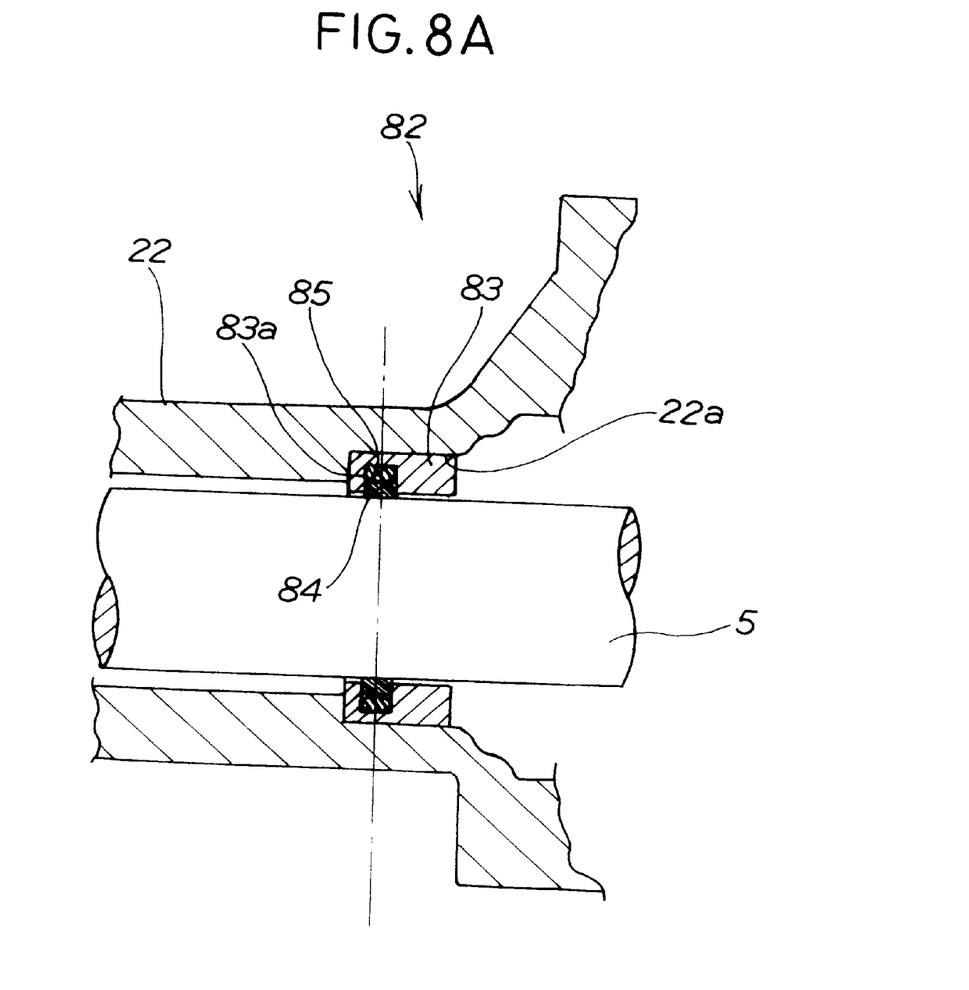
FIG. 8A is a view similar to FIG. 5A, but showing another modified form of the plain bearing according to the present invention.

FIG. 8A shows a plain bearing unit or assembly 82 according to a modification of the present invention. The plain bearing assembly includes a tubular bearing holder or retainer 83 fixedly mounted in a bearing mount hole 22a in the first housing 22, an annular plain bearing 84 slidably fitted around an intermediate portion of the rack shaft 5 and received in an annular groove 83a formed in an inner peripheral surface of the bearing holder 83, and an annular preloading member 53 received in the annular groove 83a behind the plain bearing 84 for exerting a controlled preloading force or pressure on the plain bearing 84.

Figure 8B:
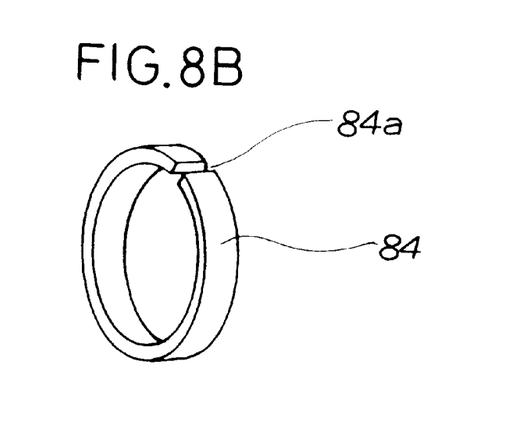
FIG. 8B is a perspective view of the modified plain bearing shown in FIG. 8A.

The plain bearing 84 is a radial sleeve bearing (often referred to as "annular bush") made preferably from a material having a low coefficient of friction, high self-lubricating characteristics and high vibration damping properties. The annular bush 84 has an inside diameter which is initially set to provide an adequate frictional contact between the annular bush 84 and the rack shaft 5. As shown in FIG. 8B, the annular bush 84 has an axial slit 84a and, hence, the inside diameter of the annular bush 84 can be changed within a certain range corresponding to the width of the slit 84a.

The annular preloading member 85 is made preferably by an elastic material, such as rubber, having an elasticity which is capable of exerting an adequate preloading force or pressure onto the annular bush (plain bearing) 84 and also damping vibration of the rack shaft 5. In the illustrated embodiment, the annular preloading member 85 is an O-ring made of rubber and fitted around an outer peripheral surface of the annular bush 84. The O-ring (preloading member) 85, as it is received in the annular groove 83a of the tubular bearing holder 83 together with the annular bush 84, is held under a somewhat distorted or compressed condition, as shown in FIG. 8A.

Operation of an electric power steering apparatus in which the rack shaft 5 supported at its intermediate portion by the plain bearing assembly 82, as shown in FIG. 8A will be described with reference to FIGS. 9A, 9B, 9C and 9D.

Figure 9A:
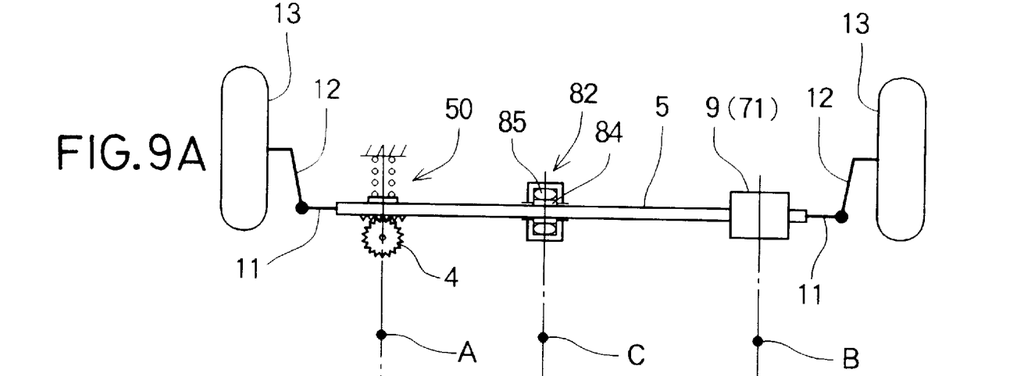
FIGS. 9A, 9B, 9C and 9D are diagrammatical views showing the behavior of the rack shaft taken in conjunction with operation of a supporting system including the plain bearing shown in FIG. 8A.

FIG. 9A is a view similar to FIG. 6A but differs therefrom in that the plain bearing 75 is replaced by the plain bearing assembly shown in FIG. 8A. Other parts of the electric power steering apparatus are the same in construction and operation are the same as those shown in FIGS. 6A–6D, and a further description of these parts can, therefore, be omitted.

Figure 9B:
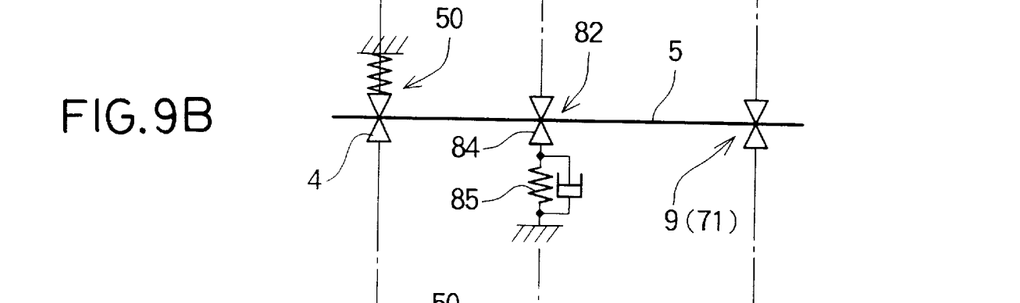

FIG. 9B diagrammatically illustrates a static condition of the rack shaft 5a. In this condition, the plain bearing 84 disposed at the bearing center C supports or bears an intermediate portion of the rack shaft 5 under the elasticity of the preloading member 85.

Figure 9C:
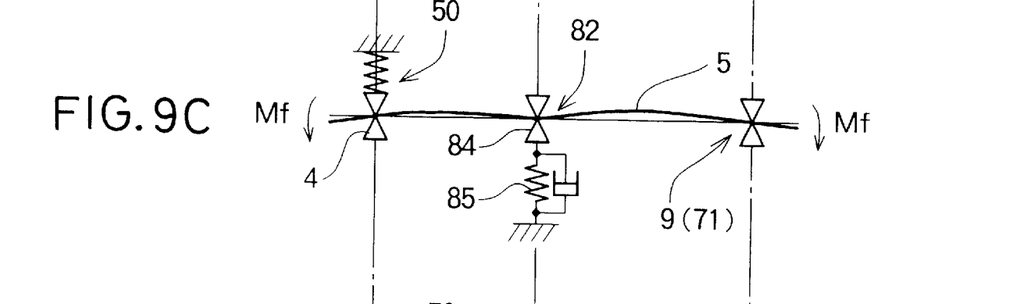
Figure 9D:
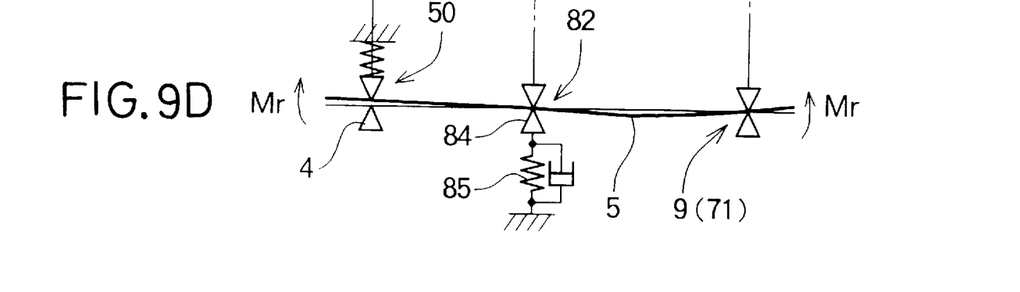

FIG. 9C illustrates the behavior of the rack shaft 5 when it is subjected to external forces or moments Mf, Mf acting from the forward direction of the vehicle. FIG. 9D is a view similar to FIG. 9C but showing the behavior of the rack shaft 5 when subjected to externals forces or moments acting from the backward direction of the vehicle. Partly due to its form of a split bush, and partly due to the elastic preloading member 85 fitted around the plain bearing 84, the plain bearing 84 has a larger vibration damping property than the split bush 75 shown in FITS. 6A–6D and, hence, can offer an enhanced vibration damping effect to the rack shaft 5. The steering wheel 2 (FIG. 1) operatively connected to the rack shaft 5 is, therefore, substantially free from vibration and, hence, can provide a comfortable steering touch or feeling to the driver and does not produce an unpleasant noise in the passenger compartment.

Since the split bush (plain bearing) 84 is continuously urged in a radial inward direction by the elastic preloading member 85, the plain bearing 84 can retain an inside diameter required to support or retain the intermediate portion of the rack shaft 5 without a loss of vibration damping properties even when it has undergone a certain degree of abrasive wear.

As described above, an electric power steering apparatus of the present invention includes a plain bearing slidably fitted around a rack shaft to support an intermediate portion of the rack shaft. With the plain bearing thus provided, the rack shaft also supported at its opposite end portions by a rack-and-pinion mechanism and a ball-screw mechanism, respectively, has a three supporting points and, hence, a support span of the rack shaft is greatly smaller than that of the conventional rack shaft (having two supporting points located at the opposite end portions thereof) and a resonance frequency of the rack shaft shifts to a higher frequency range. With this shift of resonance frequency, the rack shaft is unlikely to induce vibration as compared to the prior rack shaft. Vibration of the rack shaft which may be caused during operation of the electric power steering apparatus is considerably smaller in magnitude than that in the conventional apparatus. The plain bearing is simple in construction and can efficiently damp the vibration of the rack shaft. Since vibration of the rack shaft is considerably damped, the steering wheel operatively connected to the rack shaft does not induce noticeable vibration tending to deteriorate a comfortable steering touch or feeling and generate an unpleasant noise in the passenger compartment. The rack-and-pinion mechanism and the ball-screw mechanism both assembled with the vibration-damped rack shaft can operate stably and reliably for a prolonged period of use and, accordingly, the electric power steering apparatus is highly durable and has a long service life.

Obviously, various minor changes and modifications of the present invention are possible in the light of the above teaching. It is to be understood that within the scope of the appended claims the present invention may be practiced otherwise than as specifically described.

What is claimed is:

1. An electric power steering apparatus for a vehicle comprising:

a rack shaft extending in a transverse direction of the vehicle and having a rack of gear teeth provided at a portion of a peripheral surface of one end portion thereof and an externally threaded screw provided at the other end portion thereof;

a pinion meshing with said rack and rotatable to reciprocate said rack shaft in a longitudinal direction thereof;

a rack guide disposed in confrontation with said pinion with said rack shaft disposed therebetween and resiliently urged against said rack shaft to support said one end portion of said rack shaft between said rack guide and said pinion while guiding reciprocating movement of said rack shaft;

an electric motor for generating an assist torque corresponding to a steering torque;

a nut threadedly mounted on said screw of said rack shaft for supporting said other end portion of said rack shaft and being rotatably driven by said electric motor for applying said assist torque to said rack shaft; and a damping bearing slidably fitted around said rack shaft to support a portion of said rack shaft located intermediately between said rack guide and said nut.

2. An electric power steering apparatus according to claim 1, wherein said plain bearing is made of a high vibration damping material.

3. An electric power steering apparatus according to claim 1, wherein said plain bearing comprises a split sleeve bearing and is resiliently deformable in a radial direction to vary an inside diameter thereof so as to accommodate a thermal deformation caused due to the difference in thermal expansion coefficient between said plain bearing and said rack shaft.

4. An electric power steering apparatus according to claim 1, wherein said plain bearing comprises a sleeve bearing having a plurality of resilient projections provided on an inner peripheral surface thereof at equal circumferential intervals.

5. An electric power steering apparatus according to claim 1, wherein said plain bearing comprises a split annular bush and is resiliently deformable in a radial direction to vary an inside diameter thereof, further including an annular preloading member fitted around an outer peripheral surface of said split annular bush to exert a preloading force on said split annular bush which tends to urge said split annular bush in a radial inward direction.

6. An electric power steering apparatus according to claim 5, wherein said preloading member is made of a high vibration damping material.

7. An electric power steering apparatus according to claim 6, wherein said preloading member is made of an elastic material.

8. An electric power steering apparatus according to claim 2, wherein said plain bearing comprises a split sleeve bearing and is resiliently deformable in a radial direction to vary an inside diameter thereof so as to accommodate a thermal deformation caused due to the difference in thermal expansion coefficient between said plain bearing and said rack shaft.

9. An electric power steering apparatus according to claim 2, wherein said plain bearing comprises a sleeve bearing having a plurality of resilient projections provided on an inner peripheral surface thereof at equal circumferential intervals.

10. An electric power steering apparatus according to claim 2, wherein said plain bearing comprises a split annular bush and is resiliently deformable in a radial direction to vary an inside diameter thereof, further including an annular preloading member fitted around an outer peripheral surface of said split annular bush to exert a preloading force on said split annular bush which tends to urge said split annular bush in a radial inward direction.

* * * * *